Patented Mar. 12, 1940

2,193,470

UNITED STATES PATENT OFFICE 2,193,470

CONFECTION AND PROCESS OF MAKING SAME

Carl Bergquist, Stockholm, Sweden, assignor to Corn Products Refining Company, New York, N. Y., a corporation of New Jersey No Drawing. Original application October 28, 1937, Serial No. 171,530. Divided and this application October 5, 1938, Serial No. 233,347

6 Claims. (Cl. 99—134)

This invention relates to the production of confections of the gum or jelly type of which starch is an ingredient necessary in order to give the confection the proper consistency; and the object of the invention is to improve the flavor, body, clarity and shortness of confections of this type by substituting for the starch ordinarily used, corn (maize) or potato starch, for example, starch derived from the roots of the canna plant. The invention is based upon the discovery that if canna starch be given a mild hydrolyzing treatment such as is used, for example, in the making of thin boiling maize starches, the starch when boiled to a paste and cooled will set to a much firmer jelly than other thin boiling starches of the same hot paste viscosity. The paste is also less cloudy when it gels than other thin boiling starches. Potato starch, when made thin boiling, also gives a fairly clear cold paste, but the jelly strength of thin boiling potato starch is much less than that of thin boiling canna starch. For these reasons thin boiling canna starch can be used to special advantage in making confections of the gum drop or jelly type in which a thin boiling starch is cooked with the other ingredients to provide a syrup which, when cooled in molds, for example, gives a gum-like substance that is short in its consistency, as is desired for confections of this general type. When thin boiling canna starch is used in this connection, the gum may be given the required body and shortness with less starch than is ordinarily used, which is an advantage so far as flavor is concerned. The starch ingredient may in fact be reduced 15% more or less. Or with the same amount of starch the gum will be firmer and shorter.

The method of treating canna starch to give it the properties of thin boiling and thick setting may be substantially the same as the method commonly used for producing thin boiling maize starches. The following may be considered as a typical method:

100 parts by weight of canna starch are mixed with 130 parts of water and enough sulphuric acid to give the mixture an acidity of 0.69%. The mixture is heated to 120° F. and maintained at this temperature for twenty hours. The material is then neutralized, in the usual manner for neutralizing thin boiling starches, to a hydrogen ion concentration of pH 4.8-5.0, and is then filtered, washed and dried.

The product will be a 40 fluidity starch, so-called, having a Scott test index of 50-55.

The Scott test for determining hot paste viscosity of thin boiling starches is performed as follows: 28.35 grams of raw starch containing 12% moisture is mixed with 280 cubic centimeters of distilled water and heated on a constant temperature bath at 100° C. for fifteen minutes and stirred for the first five minutes, for ten seconds at the end of ten minutes, and for fifteen seconds at the end of twelve and three-fourths minutes. The mixture is then transferred to a cup, known as a Scott cup, heated to the temperature of the bath provided with an overflow to limit the contents to 200 cubic centimeters and provided with a discharge orifice which is immediately opened at the end of the fifteen minute period. The discharge orifice is of such size that when raw starch is modified to thin boiling starch, as above described, it will require on the average from 50 to 55 seconds for the first 50 cubic centimeters to pass through the orifice. Such thin boiling starch has, therefore, a Scott index of 50-55. Thinner starches will have lower Scott indices and thicker starches higher Scott indices.

It will be understood that the invention is not limited to the method of production, above described, which is merely typical and informative. The treatment of the starch as to acidity, time, density, and temperature will depend upon the kind of thin boiling starch desired. Hydrochloric acid or other strong acid could be used in place of sulphuric acid. Generally speaking, the known methods applicable to the modification of corn starch can be used for the treatment of canna starch and by the use of the same methods substantially the same viscosities will be obtained, as measured by the Scott test. As a general rule, for any given viscosity, the jelly strength of the canna starch will be greater than the jelly strength of thin boiling maize starch. For example, the jelly strength of a 40 fluidity canna thin boiling starch, made as aforesaid, may be about 1500, while a 40 fluidity corn starch will have a jelly strength of 640. This is in accordance with the following test:

12 grams of starch is mixed with 100 cubic centimeters of water in a four-ounce bottle provided with a stopper and stirring rod. The bottle is put into a boiling water bath and the contents stirred until the starch mixture is gelatinized, after which the heating is continued for 30 minutes. A flat brass disc 1⅜ of an inch in diameter is used as an immersion body. A brass wire is fastened to the center of the disc and the wire bent to a hook at the upper end. The disc is immersed 3 centimeters below the surface of the paste. Corn oil is poured on the top of the paste to prevent the formation of a skin and the paste left for 24 hours at 25° C. The hook of the brass wire is then attached to the beam of a balance. Weights are added to the scale pan until such weights are sufficient to make the disc move freely in the starch jelly. The strength of the jelly is determined in this way and is in terms of grams per square inch of the disc. A 40 fluidity canna starch has a jelly strength, according to this test, of 1500 while, as has been said, a 40 fluidity corn starch has a jelly strength of 640.

In using the thin boiling canna starch for confections of the gum or jelly type, the method of compounding will be the same as in using other starches except that less canna starch need be used in order to produce the same body and shortness in the gum. As an example, the following formula may be used for making a syrup suitable for molding into gum drops:

| | Pounds |
|---|---|
| Corn, or other starch, syrup | 200 |
| Cane sugar or cane sugar and dextrose | 200 |
| 40 fluidity canna starch | 40–50 |
| Water | 360–400 |

This formula is merely typical and informative. Applicant's invention, regarded from the point of view of the use of thin boiling starch in confections of this type, is not limited to any particular formula.

This application is a division of copending application filed by Carl Bergquist, October 28, 1937, Serial No. 171,530.

I claim:

1. A confection of the gum or jelly type which contains thin boiling canna starch.

2. A confection of the gum or jelly type composed of a sugar syrup containing thin boiling canna starch.

3. A confection mixture containing substances in substantially the following proportions by weight: 200 parts of starch syrup; 200 parts of sugar; 45–50 parts of 40 fluidity canna starch; and 320–400 parts of water.

4. A confection containing sugar, starch syrup, and thin boiling canna starch.

5. A confection composed of a sugar syrup and 40 fluidity thin boiling canna starch.

6. Process of making a gum or jelly-like confection which comprises: subjecting canna starch to a hydrolyzing operation which makes the starch thin boiling; and incorporating the starch with a sugar syrup and boiling the mixture to bring about the pasting of the starch.

CARL BERGQUIST.